Figure 1:
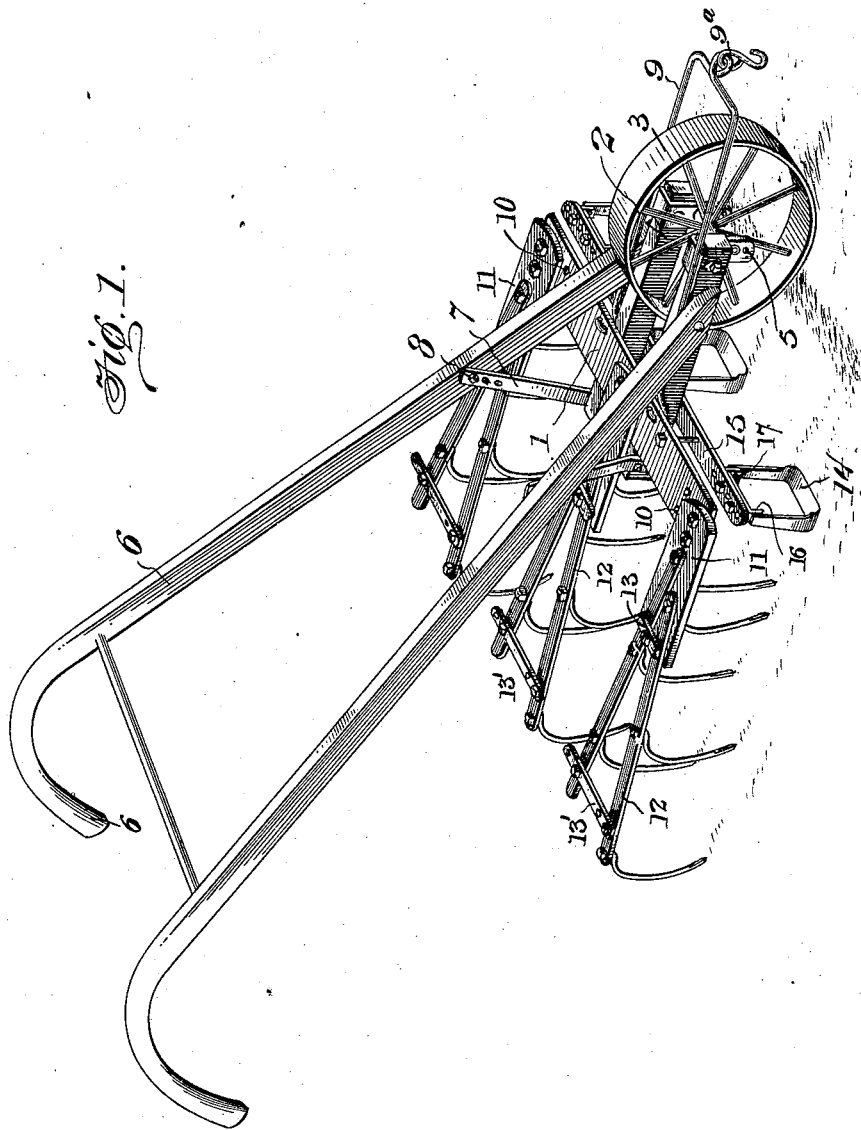

No. 686,559. Patented Nov. 12, 1901.
G. B. TODD.
CULTIVATOR.
(Application filed Nov. 23, 1900.)

(No Model.) 3 Sheets—Sheet 1.

Witnesses
Fenton S. Belt,
Geo. Kingsbury

Inventor:
George B Todd,
Mason Fenwick & Lawrence.
By
Attorneys

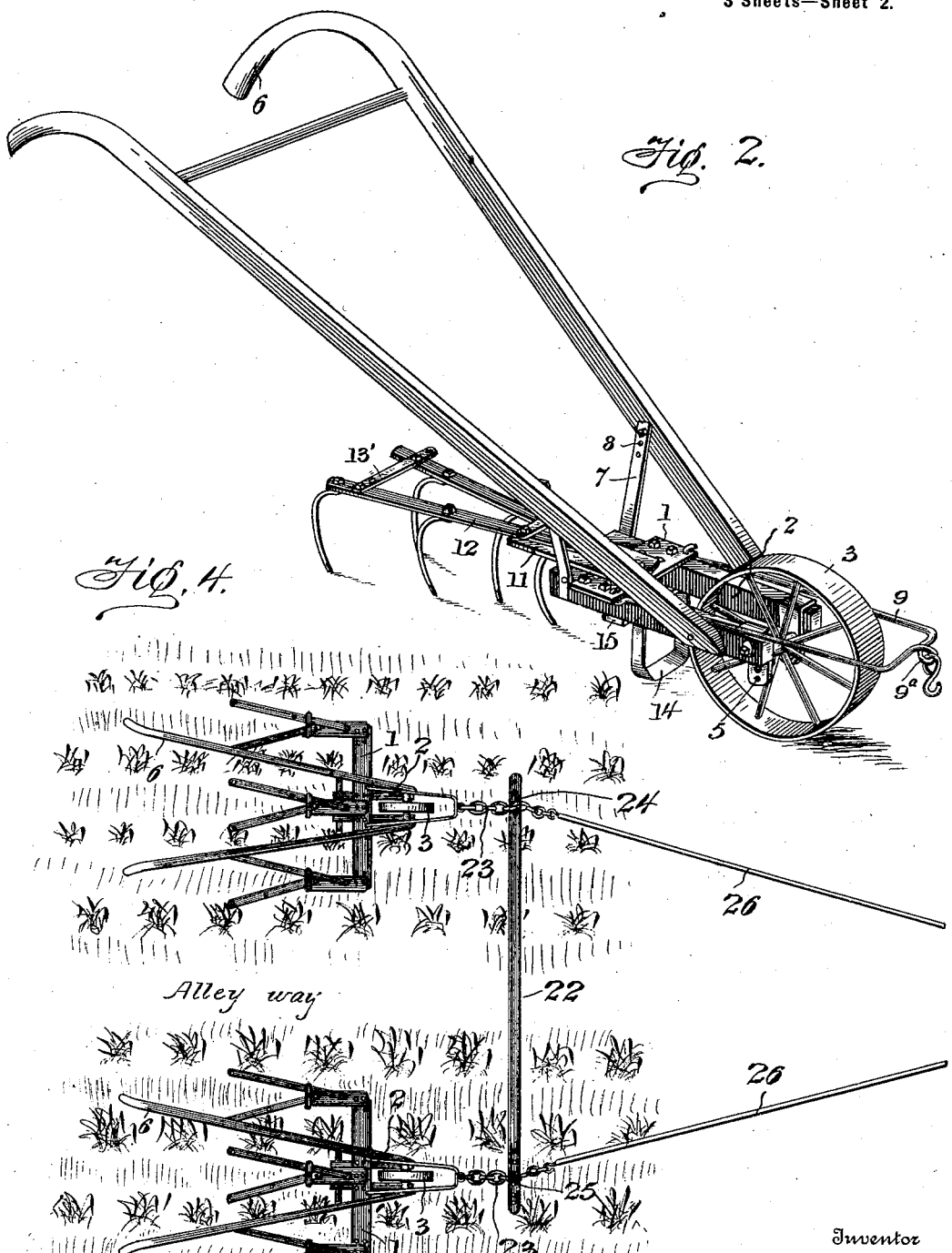

No. 686,559. Patented Nov. 12, 1901.
G. B. TODD.
CULTIVATOR.
(Application filed Nov. 23, 1900.)
(No Model.) 3 Sheets—Sheet 3.
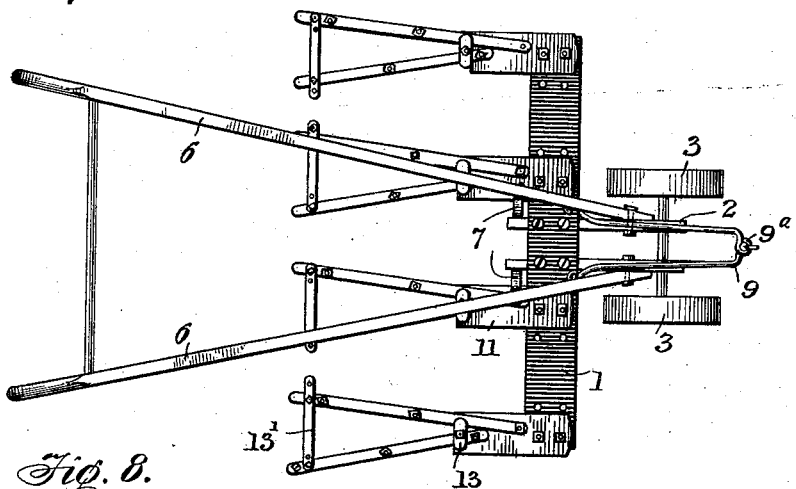
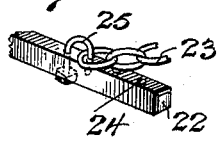
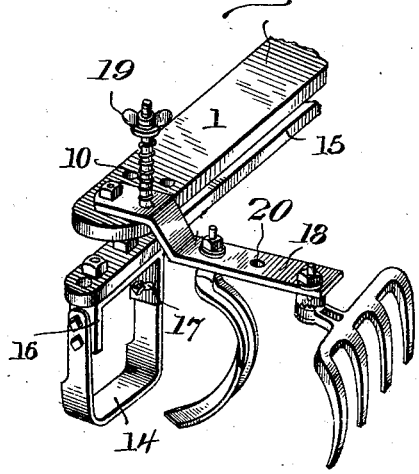
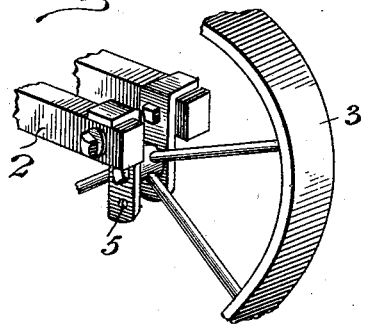
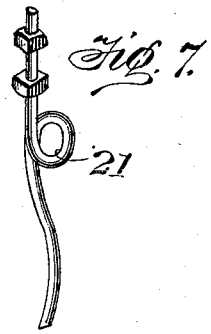
Witnesses
Fenton S. Pell
Geo. F. Kingsbury
Inventor:
George B. Todd,
Mason Fenwick & Lawrence.
By Attorneys.

UNITED STATES PATENT OFFICE.

GEORGE B. TODD, OF NORFOLK, VIRGINIA, ASSIGNOR TO NORFOLK FARM SUPPLY CO., OF NORFOLK, VIRGINIA.

CULTIVATOR.

SPECIFICATION forming part of Letters Patent No. 686,559, dated November 12, 1901.

Application filed November 23, 1900. Serial No. 37,513. (No model.)

*To all whom it may concern:*

Be it known that I, GEORGE B. TODD, a citizen of the United States, residing at Norfolk, in the county of Norfolk and State of Virginia, have invented certain new and useful Improvements in Cultivators; and I do hereby declare the following to be a full, clear, and exact description of the invention, such as will enable others skilled in the art to which it appertains to make and use the same.

My invention relates to cultivating implements designed for the cultivation of any species of vegetation, but particularly adapted for the cultivation of spinach as grown, for instance, in the Norfolk, Virginia, truck section, the same being grown in a particular manner, as will be hereinafter described.

The object of my invention is the production of a cultivating implement which can be drawn by horse-power or pushed or drawn by man-power, but preferably by the former, said cultivator carrying one or more gangs of implements, the gangs being capable of adjustment bodily and the implements of the gang being also capable of adjustment.

Another object of my invention is the capability of connecting two or more machines, so that two or more beds may be cultivated simultaneously, and making the connecting means adjustable, so as to adapt the machines to cultivating different widths of beds, and so arranging and locating the draft that the operators will be enabled to properly guide the machine.

The invention consists in certain novel constructions, combinations, and arrangements of parts, as will be hereinafter described and specifically claimed.

In the accompanying drawings, Figure 1 is a perspective view of a single-wheel cultivator constructed in accordance with my invention and provided with three gangs of cultivating-tools. Fig. 2 is a similar view showing only a single gang of cultivating-tools. Fig. 3 is a top plan view of my cultivating instrument provided with two wheels and four gangs. Fig. 4 is a top plan view of two spinach-beds with an "alley" between them and two machines in operative position upon the same and connected by my adjustable spreader-bar. Fig. 5 is a perspective view of a portion of the front wheel, showing means for raising and lowering the same. Fig. 6 is a perspective view of a portion of the main cross-bar or frame of the machine, showing my improved spring-actuated arm attached thereto and carrying different forms of cultivating instruments and showing means for adjusting the knife to different inclinations. Fig. 7 is a perspective view of a modified form of tooth, and Fig. 8 is a detail perspective view of a portion of the spreader and chain.

In the truck section of Norfolk, Virginia, large sums of money have been expended in preparing the ground for the cultivation of spinach. This product is grown under a high state of cultivation, the beds running the entire length of the field, an alley (which is a space wider than the space between the rows in the bed) being left between each two of the beds, as shown in Fig. 4, for the purpose of carrying off the water and in which a horse walks in pulling the cultivator and also for permitting the grower to perform the necessary handwork in cultivating and thinning out from time to time. The rows of plants run on the bed lengthwise, which makes each row as long as the bed. The crop is sown in a number of rows to the bed, varying in the number of rows from one to ten, and they are generally from eight to ten inches apart on the bed. The alley is generally from twenty to twenty-four inches wide from the outside row of one bed to the outside row of the other bed. The bulk of the crop is sown four rows to the bed. It is in this latter form of growing that I use my one-wheel three-gang cultivator, as shown in Fig. 4, preferably handling two beds at a time by placing one machine on each bed and one man to each machine and one horse to pull the two machines, this being rendered possible by means of an adjustable spreader-bar, as will be hereinafter described.

The style of implement shown in Fig. 2, which employs a single wheel and single gang, may be used by hand or horse and does the same class of work as the larger-sized machine, except that its capacity is limited to one row at a time.

The type of machine which is in greatest demand is that illustrated in Fig. 1, and I will describe this construction before taking up the others, the construction of the parts being practically the same as the machine shown in Figs. 2 and 3, with either the addition or subtraction of a part.

1 in the drawings represents the main cross-bar of the machine, which is attached to two longitudinally-extending spaced bars 2 2, between which latter the wheel 3 operates, said wheel being held in place by means of straps secured to said bars 2 2, which project downwardly from said bars and are provided with adjusting-holes 5, which receive the axle supporting said wheel and by means of which holes the wheel can be raised or lowered and held in said adjusted position by withdrawing the axle and placing it in another set of holes and replacing the securing-nut. It is obvious that instead of employing a series of adjusting-holes longitudinal slots might be employed and the same results be accomplished.

When it is desired to employ two wheels instead of one, the change can be effected by using a longer axle and locating the wheels on the outside of the longitudinally-extending bars 2 and securing the wheels in this position.

The handles 6 are pivoted at their lower forward ends to the longitudinal bars 2 2 and are further supported by means of straps 7, which extend from the rear ends of the bars 2 2 to suitable points on the handles. These straps 7 are provided with adjusting-holes 8, by means of which the handles can be raised and lowered to suit the height and convenience of different operators and be held in such adjusted position.

The draft iron or bail 9 is formed, preferably, from a single piece of round iron and provided with hooked ends which engage holes in the main cross-bar 1 and is formed with an eye 9ª at its forward end, to which an ordinary cockeye or other suitable device may be readily applied. By attaching the draft iron or bail to the main cross-bar where the pull is from the center of the machine where the strain is centered the lifting of the wheel or wheels from the ground is prevented. The draft iron or bail rises or falls continually, according to the action of the horse or machine—that is, the front rises and falls to make a straight line from the point of draft to the horse's back-band or hames, as the case may be.

The main cross-bar is designed to carry any number of gangs of implements; but in Fig. 1 only three gangs are shown. The gangs are capable of lateral adjustment bodily without changing the teeth themselves by simply locating a gang in any one of the series of holes 10 provided in said bar for the purpose. I preferably provide for three lateral adjustments of each gang by arranging sets of holes, the holes of each set being about one inch apart. This adapts the machine to cultivating vegetation planted in rows at different distances apart.

Each gang consists, preferably, of a plate, as 11, which is secured to the main cross-bar 1 by nuts and bolts and extends rearwardly therefrom, and to this plate 11 are secured at its rear end drag-bars 12 12, which bars are further secured and braced near their forward ends by means of a short plate 13, and the rear ends of the bars 12 are connected by a strap 13', which latter is provided with a series of adjusting-holes, by means of which the bars 12 may be adjusted laterally to suit the convenience of the work.

By the construction and arrangement thus far described it will be seen that not only can the gang be moved bodily laterally by being detached, moved laterally and reattached in different holes in the cross-bar 1, but also a single drag-bar of a gang, or both drag-bars thereof, can be adjusted with respect to each other. I regard this as an important feature of my invention.

Any style of implement or plurality of different implements can be carried in a gang and adjusted to suit the character of the work that it is desired to perform.

In Fig. 1 I have shown gangs carrying ordinary teeth and in addition knives 14, which latter are carried by means of a bar 15, located beneath the main cross-bar 1, and which bar is secured to the under side of the longitudinally-extending bars 2. Means for supporting these knives consist of U-shaped hangers 16, secured to the under side of the said bar 15, which hangers are capable of lateral adjustment by providing a plurality of holes in said bar 15. The knives are capable of adjustment to different inclinations, so as to cut shallow or deep, according to the work being performed, and it will be observed that all of the knives may be at different inclinations backward or forward at the same time, which is important for the reason that the ground being operated upon may be slanting, and by being able to adjust all of the knives to different relative inclinations the same depth of cut may be made by all of the knives. These inclinations of the knives are accomplished by providing the depending portions of the U-shaped hangers 16 with elongated diagonal slots 17, as clearly shown in Fig. 6, and by tightening up the connecting-bolts the knives can be held at the desired adjusted inclination. Any combination of cultivating-tools may be employed at the same time—as, for instance, as shown in Fig. 6.

Under some conditions and at certain stages of cultivation it is desirable to employ a spring-actuated arm which will yield to obstructions and permit the tool to pass over the same without breaking. For this purpose I connect the arm 18 to the main cross-bar 1 by means of two bolts, one of which is longer than the other, and interpose a coil-spring between the upper surface of the cross-bar and the under side of the winged nut 19, by means of which the tension of the spring may be increased or diminished, and consequently the spring action of the arm 18 regulated. The spring-arm 18 is provided with a series of apertures 20, which are arranged, preferably, on a diagonal line, so that the tools may be arranged on the same so that each will be in different alinement, or where only one tool is employed will enable the tool to be placed near to or far from the work.

In Fig. 7 is shown a slightly-modified construction of tooth, the same being provided with a loop 21, as shown. Each gives strength and spring to this tooth and prevents the same from being bent or accidentally snapped off.

In Fig. 2 I have shown the cultivator provided with a single gang and which produces a very complete hand-operated garden-tool. In this construction not only are the arms of the gang capable of adjustment with respect to each other, but the gang is also capable of bodily adjustment laterally, as described in connection with the construction shown in Fig. 1. This is particularly an improvement in a garden-tool, as it enables the tools to be brought as near to or as far from the work as desired and at the same time permits the position of the wheel to remain unaltered. I regard this as a superior construction to having the gang stationary and the wheel located to one side of the machine.

In Fig. 3 I have shown the cultivator provided with two wheels and four gangs. This machine is designed for use in beds where an odd number of rows are sown. In using this machine one wheel is placed on each side of the frame, as heretofore described.

With each machine two wheels are sold and an extra axle, so that the conversion from a one-wheel implement to a two-wheel implement is readily accomplished. In using the two-wheel cultivator the two wheels follow in the two center spaces on the bed and the middle gangs follow in the same line. The two-wheel machines have either two, four, six, or eight gangs and will work beds having, respectively, one more row than there are gangs on the machine.

One machine may be used alone; but in the cultivation of spinach it is not practicable to use one horse to a single machine, as it would put the horse on the bed. Two horses can be used with one machine; but the two horses would have to make two trips to cultivate two beds.

By the use of my improved spreader-bar and the manner of connecting the same, as shown in Fig. 4 and as will now be described, one horse can pull two machines and cultivate two beds at one trip, thus enabling one horse to do the work of four horses, as without my improved spreader-bar it would require two horses to each machine. The value of my improved spreader-bar and attachment is thus very apparent.

The spreader-bar 22 is constructed, preferably, of wood and is made of a length to extend so that the middle hole of the series of adjusting-holes on each end of the bar will come over the center of the two beds, and any variation of the distance from center to center of the beds will be overcome by using the different holes either to shorten or lengthen the distance to get the desired result. A short chain 23 extends from the draft-iron of each respective machine to the proper adjusting-hole in the spreader-bar. The spreader-bar is attached to the chains a short distance in advance of each machine, which enables each operator to guide his respective machine and overcome any differences in the widths of the beds that may have occurred in planting. The spreader-bar is provided with a series of holes 24 at each end and screw-eyes 25, secured in the proper holes.

The traces 26 are attached at their inner ends to the outer ends of the short chains 23 23 and at their outer ends are connected to the hames or back-band, as the case may be. This arrangement will enable two or more beds to be cultivated successfully by the use of a single horse and a single operator at each machine. This same arrangement will cultivate two rows very thoroughly. When used in this way, the outside gangs work the outside of the row from the alley side.

In cultivating spinach in some sections of the country, as in the Norfolk, Virginia, truck section, the beds are thrown up high to overcome the bad effects of water, and when four rows are put on a bed the outside rows come very close to the edge of the bed, and it is not then practicable to work the outside, as it knocks the bed down and does little good to the crop. The two three-row machines and a spreader-bar may be also employed upon seven-row beds, there being six spaces on a seven-row bed. One half of each bed would be worked at the same time and the other half would be finished when coming down the next alley.

The different attachments are used according to different conditions. Loamy clean soil and when plants are small do not need the knives or hoes; but under such conditions the spring-arm carrying a light rake is found very useful. Later the regular gangs are used, also hoes, where grass is growing in the beds or where the soil is stiff or caked. The regular gangs will perform the work usually in a satisfactory manner.

Having now described my invention, what I claim as new, and desire to secure by Letters Patent, is—

1. A cultivating implement, comprising a suitable framework, a cross-bar supported thereby, drag-bars carried by said cross-bar, each of said drag-bars carrying a plurality of implements, a centrally-arranged front wheel, means for adjusting each drag-bar bodily laterally on the cross-bar, hangers carried by the framework for supporting the wheel provided with means for adjusting the same, and suitable handles adjustably secured to the framework, substantially as described.

2. A cultivator, comprising a frame composed of spaced, longitudinally-extending bars, and a laterally-extending cross-bar secured to said bars, pairs of drag-bars carried by said frame, each drag-bar carrying a plurality of implements, a centrally-arranged front wheel which is journaled between the longitudinally-extending bars, means for adjusting each pair of drag-bars transversely bodily at the forward end thereof, and a suitable draft-iron connected to said frame, substantially as described.

3. A cultivating implement having a suitable framework consisting of spaced longitudinally-extending bars, and a laterally-extending cross-bar, which extends to both sides of the longitudinally-extending bars, a front wheel operated between the longitudinally-extending bars, suitable handles connected to said bars, plates extending rearwardly from said cross-bar and a plurality of sets of drag-bars connected to said cross-bar by being secured to said plates and extending rearwardly therefrom, each of the sets being capable of lateral adjustment together with its respective plate bodily on the cross-bar at the forward ends of said sets, and the respective bars of each set being also capable of adjustment laterally with respect to each other, and cultivating implements carried by said drag-bars, substantially as described.

4. A cultivating implement comprising in its construction a framework consisting of spaced, longitudinally-extending bars, suitable handles connected therewith, a wheel carried between the bars, a plate or bar extending across said longitudinally-extending bars, a plate extending rearwardly from the laterally-extending bar, a plurality of drag-bars connected with said rearwardly-extending plate and extending rearwardly therefrom, a strap provided with adjusting-holes connecting said drag-bars near their rear ends, a securing or locking strap connecting the arms near their front ends, substantially as described.

In testimony whereof I hereunto affix my signature in presence of two witnesses.

GEORGE B. TODD.

Witnesses:
CHAS. C. KNIGHT,
WM. H. LAND.